(12) United States Patent
Muley et al.

(10) Patent No.: US 9,714,775 B2
(45) Date of Patent: Jul. 25, 2017

(54) HVAC SYSTEMS AND METHODS WITH IMPROVED HEAT EXCHANGERS

(71) Applicant: Lennox Industries Inc., Richardson, TX (US)

(72) Inventors: Kirankumar Muley, Maharashtra (IN); Kapil Sahu, Chennai (IN); Glenn W. Kowald, Carrollton, TX (US); Ajay C. P. Swornalatha, Tamilnadu (IN); Ian Burmania, Carrollton, TX (US); John Whitesitt, Carrollton, TX (US); Donald Zimmer, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 419 days.

(21) Appl. No.: 14/315,251

(22) Filed: Jun. 25, 2014

(65) Prior Publication Data

US 2015/0377512 A1  Dec. 31, 2015

(51) Int. Cl.
*F24H 8/00* (2006.01)
*F24H 9/00* (2006.01)
*F24D 5/02* (2006.01)
*F24H 3/08* (2006.01)
*F28F 1/40* (2006.01)
*B23P 15/26* (2006.01)
*F28F 13/06* (2006.01)
*F28F 13/12* (2006.01)
*F28D 21/00* (2006.01)

(52) U.S. Cl.
CPC ............... *F24H 8/00* (2013.01); *F24D 5/02* (2013.01); *F24H 3/087* (2013.01); *F24H 9/0068* (2013.01); *F24H 9/0073* (2013.01); *F28D 21/0003* (2013.01); *F28F 13/06* (2013.01); *F28F 13/12* (2013.01); *Y02B 30/102* (2013.01)

(58) Field of Classification Search
CPC .... F28D 7/082; F28D 7/1615; F28D 1/05325; F28D 1/0475; F28F 21/067; F28F 13/12; F28F 13/06; F24H 8/00; F24H 9/0068; F24D 5/02
USPC .................................................. 165/76, 109.1
See application file for complete search history.

(56) References Cited

U.S. PATENT DOCUMENTS 4,270,690 A * 6/1981 Mabery ................. B21C 37/153
                                                 228/173.5
4,727,907 A * 3/1988 Duncan .................... F28F 13/12
                                                 138/38
2008/0314378 A1* 12/2008 Khan ...................... F24H 3/087
                                                 126/99 R

FOREIGN PATENT DOCUMENTS

GB           1146162 A *  3/1969  ............. F22B 37/18

* cited by examiner

*Primary Examiner* — Avinash Savani
*Assistant Examiner* — Rabeeul Zuberi
(74) *Attorney, Agent, or Firm* — Hubbard Johnston, PLLC

(57) ABSTRACT

Systems, tools, and methods are presented that enable a plurality of turbulators to enhance heat transfer within a heat exchanger of a heating, ventilating, and air conditioning (HVAC) system. The plurality of turbulators each include a ribbon member having a variable pattern formed over a length. In one instance, the variable pattern of the ribbon member includes a plurality of bends defining intervals of alternating pitch. The intervals progressively increase in dimension as the ribbon member is traversed over the length. In another embodiment, the intervals contain apertures whose area increases as the length is traversed. Other systems, tools and methods are presented.

14 Claims, 5 Drawing Sheets

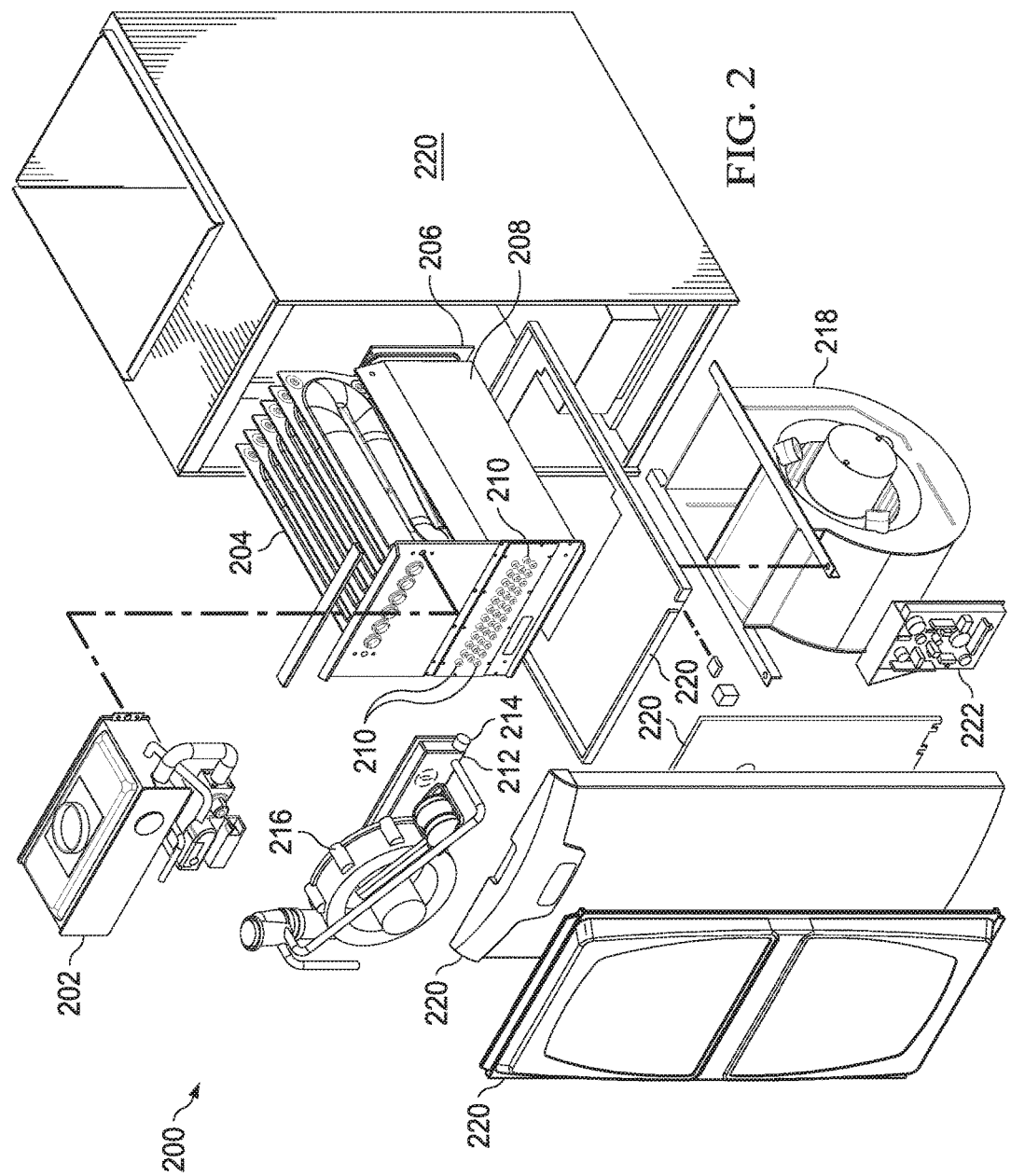

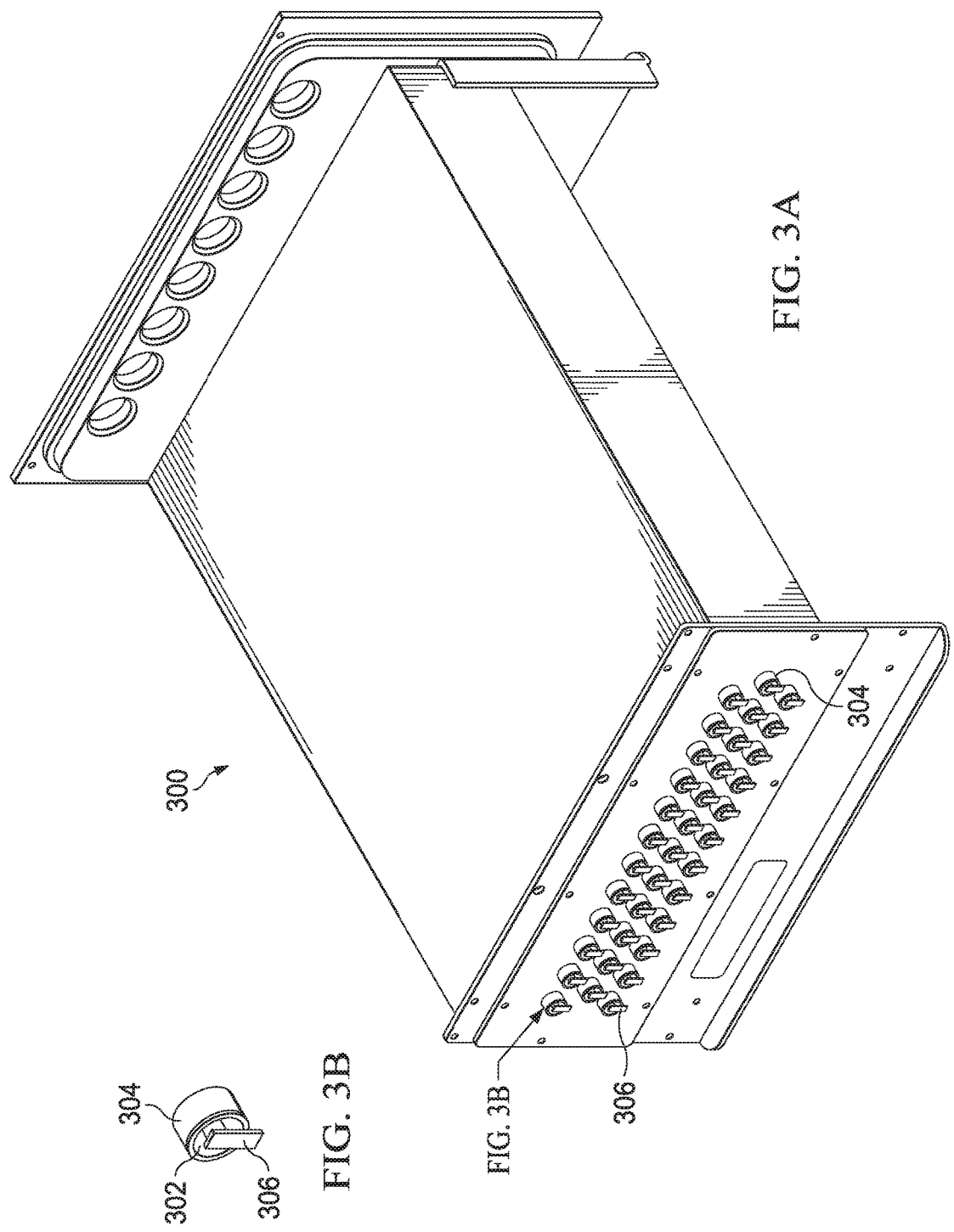

HVAC SYSTEMS AND METHODS WITH IMPROVED HEAT EXCHANGERS

TECHNICAL FIELD

The present disclosure relates generally to heat exchangers for heating, ventilating, and air conditioning (HVAC) systems, and more particularly, to HVAC systems and methods with heat exchangers that incorporate turbulators to enhance thermal energy transfer within gas furnaces.

BACKGROUND

Gas furnaces in HVAC systems commonly employ a heat exchanger to transfer heat from a hot flow to a cold flow. In such furnaces, the hot flow is typically generated by igniting fuel to produce combustion products. The combustion products are then circulated through the heat exchanger. In contrast, the cold flow is produced by drawing air at ambient temperature into the gas furnace. The drawn air is then convectively forced across the heat exchanger. A temperature difference between the hot flow and the cold flow allows the heat exchanger to extract heat from the circulating combustion products and deposit such heat into a convection current of drawn air.

BRIEF DESCRIPTION OF THE DRAWINGS

Illustrative embodiments of the present disclosure are described in detail below with reference to the attached drawing figures, which are incorporated by reference herein.

FIG. 2 is an exploded view of an illustrative embodiment of a gas furnace for use as an aspect of an HVAC system according to an illustrative embodiment;

FIG. 3A is a perspective view of a heat exchanger for heat transfer with a gas furnace in an HVAC system according to an illustrative embodiment;

FIG. 3B is a detail, perspective view of the heat exchanger of FIG. 3A showing a turbulator positioned in a conduit at a second end;

Figure 1:
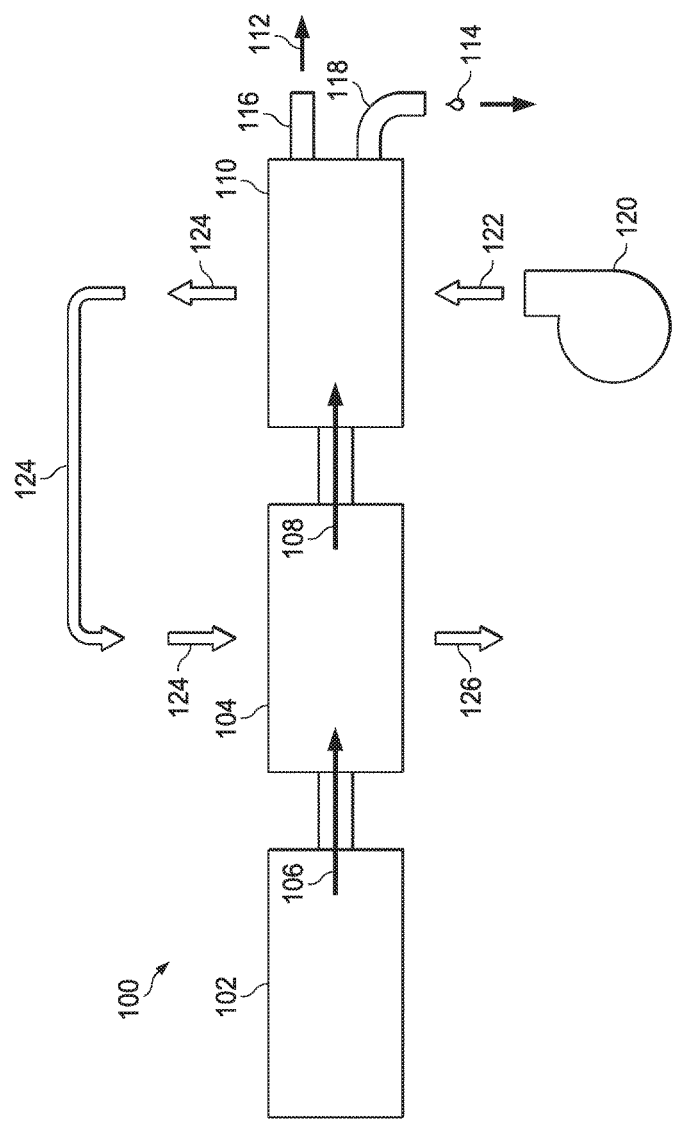
FIG. 1 is a schematic diagram of a gas furnace for use in an HVAC system, according to an illustrative embodiment.

The figures described above are only exemplary and their illustration is not intended to assert or imply any limitation with regard to the environment, architecture, design, configuration, method, or process in which different embodiments may be implemented.

DETAILED DESCRIPTION OF THE ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same reference numerals or coordinated numerals. The drawing figures are not necessarily to scale. Certain features of the illustrative embodiments may be shown exaggerated in scale or in somewhat schematic form and some details of conventional elements may not be shown in the interest of clarity and conciseness.

To increase energy efficiencies, gas furnaces in HVAC systems often utilize two heat exchangers. These two heat exchangers, referred to as the primary heat exchanger and the secondary heat exchanger, are sequentially positioned within the hot flow and the cold flow. Important aspects of the disclosure relate to the secondary heat exchanger.

In the two-heat-exchange system, the hot flow travels from the primary heat exchanger to the secondary heat exchanger while the cold flow travels counter from the secondary heat exchanger to the primary heat exchanger. Heat transfer between the two flows causes the hot flow to progressively decrease in temperature while the cold flow progressively increases in temperature. Thus, the primary heat exchanger experiences the hot flow and the cold flow both within an upper range of their respective operating temperatures. Conversely, the secondary heat exchanger experiences the hot flow and the cold flow both within a lower range of their respective operating temperatures. The secondary heat exchanger therefore functions at lower temperatures than the primary heat exchanger.

The lower temperatures of the secondary heat exchanger are conducive to forming condensate from vapors within the combustion products. Thus, heat transfer within the secondary heat exchanger may also involve forming a condensate. To enhance heat transfer, the secondary heat exchanger may incorporate a plurality of turbulators which serve, in part, to increase a production of condensate. The plurality of turbulators are operational to induce turbulence within the combustion products. Such turbulence improves contact between the combustion products and the secondary heat exchanger and accelerates thermal mixing. The presence of turbulators within the secondary heat exchanger mitigates a loss of thermal energy that might otherwise occur if the condensate-capable vapors escaped. Improvements in turbulator performance herein benefit gas furnaces by increasing their energy efficiencies.

The embodiments described herein relate to heat exchangers for HVAC systems that incorporate a plurality of turbulators to improve an energy efficiency of a gas furnace. More specifically, systems, tools, and methods are presented that enable a plurality of turbulators to enhance heat transfer within a heat exchanger using a ribbon member having a variable pattern formed over a length. In one embodiment, the variable pattern of the ribbon member includes a plurality of bends defining intervals of alternating pitch. The intervals progressively increase in dimension as the ribbon member is traversed over the length. In another embodiment, the intervals are of equal length but contain apertures whose area increases as the length is traversed. Other systems, tools and methods are presented.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings. Other means may be used as well.

Now referring to the drawings, FIG. 1 presents a schematic diagram of a gas furnace 100 for use as an aspect of an HVAC system, according to an illustrative embodiment. The gas furnace 100 includes a burner 102 for combusting fuel that provides a source of thermal energy. Non-limiting examples of fuel include wood, coal, oil, natural gas, petroleum, diesel, and natural gas. Other fuels are possible. Coupled to the burner 102 is a primary heat exchanger 104. The primary heat exchanger 104 is configured to receive combustion products 106 from the burner 102 and extract heat from the combustion products 106. The combustion products 106 exit the primary heat exchanger 104 as cooled combustion products 108, having lost thermal energy. The gas furnace also includes a secondary heat exchanger 110. The secondary heat exchanger 110 is coupled to the primary heat exchanger 104 and configured to receive the cooled combustion products 108. The secondary heat exchanger 110 extracts heat from the cooled combustion products 108 using a plurality of turbulators (not shown). This secondary extraction produces a gas exhaust 112 and often a condensate 114. The condensate 114 is formed when condensate-capable vapors in the cooled combustion products 108 are induced by the plurality of turbulators to liquefy. The plurality of turbulators and their corresponding characteristics are described below in relation to FIGS. 2-4. The secondary heat exchanger 110 incorporates an exhaust port 116 to enable the gas exhaust 112 to exit the gas furnace 100. The secondary heat exchanger 110 also incorporates a drainage port 118 to allow the condensate 114, typically water, to drain out of the gas furnace 100.

To assist with heat extraction, the gas furnace 100 includes a blower 120. The blower 120 generates an air current 122 from air at ambient temperature. The blower 120 may push air as shown or may create a negative pressure and be located elsewhere to pull the air. Passage of the air current 122 across the secondary heat exchanger 108 produces a first heated air current 124. The first heated air current 124 forms when heat from the partially cooled combustion products 108 is transferred to the air current 122 by the secondary heat exchanger 110. An air-flow guide (not shown) directs the first heated air current 124 across the primary heat exchanger 104 producing a hotter, second heated air current 126. The second heated air current 126 forms when heat from the combustion products 106 is transferred to the first heated air current 124 by the primary heat exchanger 104. The second heated air current 126 may exit the gas furnace 100 through one or more ventilation ducts of the HVAC system, if present. It will be appreciated that while the combustion products 106 progressively decrease in temperature while passing through the gas furnace 100, the air current 122 progressively increases in temperature. The combustion products 106, 108 therefore form a hot flow which, in the gas furnace 100, runs thermally counter to a cold flow formed by the air currents 122, 124, 126.

In operation, the burner 102 converts fuel and air into combustion products 106 which convey thermal energy through the gas furnace 100. Such thermal energy is transferred to the air current 124 using the primary heat exchanger 104 and the air current 122 using the secondary heat exchanger 110. A temperature gradient between the hot flow and the cold flow enables the primary heat exchanger 104 to transfer heat from the combustion products 106 to the first heated air current 124 creating partially cooled combustion products 108. The temperature gradient also enables the secondary heat exchanger 110 to transfer heat from the partially cooled combustion products 108 to the air current 122. Within the secondary heat exchanger 110, the plurality of turbulators induces turbulence in the cooled combustion products 108 to enhance heat transfer therefrom. Operational aspects of the plurality of turbulators are described below in relation to FIGS. 2-4. The cooled combustion products 108 exit the secondary heat exchanger 110 either as gas in the formed exhaust 112 via the exhaust port 116 or as condensate 114 via the drainage port 118. Thus, the hot flow 106 exits the gas furnace 100 after being depleted substantially of thermal energy. The blower 120 assists with heat transfer by forcing convection of the cold flow through the gas furnace 100. The blower 120 displaces the first heated air current 124 and the air current 122 across, respectively, the primary heat exchanger 104 and the secondary heat exchanger 110. The blower 120 controls the air current 122 to regulate a temperature and a production rate of the second heated air current 126. The cold flow 122 therefore exits the gas furnace 100 having substantially gained thermal energy from the hot flow.

Now referring primarily to FIG. 2, an exploded view is shown of a gas furnace 200 for use in an HVAC system according to an illustrative, non-limiting embodiment. Certain components of the gas furnace 200 are depicted as uncoupled to improve clarity. Such depictions, however, are not intended to counter descriptions below which state one or more components as being coupled. The gas furnace 200 includes a burner 202 for producing a heated gas. Coupled to the burner 202 is a primary heat exchanger 204. The primary heat exchanger 204 is configured to receive the heated gas from the burner 202 and convey the heated gas into a plenum 206. The gas furnace 200 also includes a secondary heat exchanger 208. The plenum 206 couples the secondary heat exchanger 208 to the primary heat exchanger 204 thereby forming a continuous flow path to the burner 202. This flow path fluidly couples the secondary heat exchanger 208 to the burner 202, enabling the secondary heat exchanger 208 to receive the heated gas from the burner 202. The plenum 206 may serve to homogenize pressure in the heated gas before passing such gas onto the secondary heat exchanger 208.

The secondary heat exchanger 208 includes a plurality of conduits 210 having a corresponding plurality of turbulators (e.g., 302 in FIG. 3) disposed therein. In some embodiments, a single turbulator is disposed within a single conduit 210. Each turbulator includes a ribbon member having a first end and a second end. The first end of the ribbon member is proximate an entry flow of heated gas into the secondary heat exchanger 208. In FIG. 2, the first end of the ribbon member is proximate the plenum 206 and the second end is proximate a collection box 212. A length extends from the first end to the second end and contains a varying pattern that is formed into the ribbon member over the length. The ribbon member is operational to induce turbulence in heated gas flowing through the conduit 210. Such turbulence increases contact with the conduit 210 and enhances thermal mixing therein. The varying pattern allows the ribbon member control over turbulence within the conduit 210, thereby offering a means to augment heat transfer. The ribbon member and the varying pattern are discussed further in relation to FIG. 4.

While not limited to theory, the converging/diverging area of the turbulator acts to create a restriction (pressure drop) thru conduit 210 and disrupts the laminar flow of flue gases (adds turbulence) increasing the overall heat transfer coefficient. In addition, the turbulator geometry acts to effectively reduce the cross-sectional area of the tube (increasing flow velocity) and diverts flue gas flow from the center of the tube to the heat transfer surface (conduit wall) further enhancing heat transfer. As the heated fluid travels from first end to second end, the temperature, pressure, and moisture content change continuously as heat is extracted and water vapor is condensed. The variable pattern, e.g., variable pitch, variable aperture design, etc., of the turbulator accounts for these changing conditions and thus maximizes heat transfer along the entire length of conduit 210 while minimizing pressure drop thru the conduit 210.

The collection box 212 is coupled to the secondary heat exchanger 208 and includes a drain port 214. The collection box 212 is configured to receive a gas exhaust and a condensate from the secondary heat exchanger 208. The condensate, typically water, enters the collection box 212 from the plurality of conduits 210 and is expelled from the gas furnace 200 using the drain port 214. An exhaust blower 216 is coupled to the collection box 212 and is configured to generate a negative pressure within the collection box 212. Such negative pressure induces a draft within the heated gas, drawing the heated gas sequentially from the burner 202 through primary heat exchanger 204, the plenum 206, and the secondary heat exchanger 208. The exhaust blower 216 therefore assists in establishing a hot flow through the gas furnace 200. The exhaust blower 216 also removes gas exhaust from the collection box 212 and is configured to expel such exhaust out of the gas furnace 200. It will be appreciated that, because the secondary heat exchanger 208 resides downstream of the primary heat exchanger 204, the secondary heat exchanger 208 operates at lower temperatures. Such lower temperatures are conducive to condensing vapors within the plurality of conduits 210.

The gas furnace 200 includes a blower 218 for generating air flow across the primary heat exchanger 204 and the secondary heat exchanger 208. The blower 218 is configured to draw in air at ambient temperature and establish a cold flow through the gas furnace 200. The blower 218 is positioned relative to the primary heat exchanger 204 and the secondary heat exchanger 208 so that air flowing through the gas furnace 200 interacts first with the secondary heat exchanger 208 and then with the primary heat exchanger 204. The blower 218 may utilize positive or negative pressure to create air flows. In some embodiments, the gas furnace 200 includes an enclosure 220 to position the blower 218, the primary heat exchanger 204, and the secondary heat exchanger 206 relative to each other. In such embodiments, the enclosure 220 may form an air guide to direct air flow across the primary heat exchanger 204 and the secondary heat exchanger 208. The enclosure 220 may also position additional components of the gas furnace 200 such as the burner 202, the plenum 206, the collection box 212, and the exhaust blower 216. Other components are possible.

In certain embodiments, the gas furnace 200 incorporates a controller 222 to regulate the burner 202, the exhaust blower 216, and the blower 218. The controller 222 is communicatively coupled to the burner 202, the blower 218, or other components to be controlled. The controller 222 may also be communicatively coupled to one or more environmental sensors in the conditioned space or to a thermostat. In these embodiments, the controller 222 functions cooperatively with the burner 202, the exhaust blower 216, and the blower 218 to establish a temperature and a magnitude of air flow leaving the gas furnace 200.

In operation, the burner 202 produces the heated gas which, due to the negative pressure created by the exhaust blower 216, flows sequentially through the primary heat exchanger 204, the plenum 206, and the secondary heat exchanger 208. This sequential flow forms the hot flow of the gas furnace 200. Within the secondary heat exchanger 208, the heated gas passes through the plurality of conduits 210 where turbulence is induced therein by the plurality of turbulators. Concurrently, the blower 218 generates air flow across the secondary heat exchanger 208 and the primary heat exchanger 204. This air flow establishes the cold flow. A temperature gradient between the hot flow and the cold flow enables the primary heat exchanger 204 and the secondary heat exchanger 208 to transfer heat from the heated gas to the air flow. After exiting the secondary heat exchanger 208, the heated gas enters the collection box 212. The heated gas, now being substantially depleted of useful thermal energy, is expelled from the gas furnace 200 by the exhaust blower 216. Condensate from the plurality of conduits 210 may also enter the collection box 212. The drain port 214 allows the condensate to exit the gas furnace 200 with the assistance of gravity.

Now referring primarily to FIG. 3A, a perspective view is presented of a heat exchanger 300 for heat transfer with a gas furnace in an HVAC system, according to an illustrative embodiment. The heat exchanger 300 of FIG. 3A may serve as the secondary heat exchanger 208 in FIG. 2. The heat exchanger 300 includes a plurality of turbulators 302 disposed within a corresponding plurality of conduits 304. Each turbulator 302 includes a ribbon member (see 402 in FIGS. 4A and 4B) having a first end (not explicitly shown, but opposite a second end 306) and the second end 306. A length extends from the first end to the second end 306 and contains a varying pattern that is formed into the ribbon member over the length. FIG. 3B shows a representative turbulator 302 positioned in a corresponding conduit 304 at a second end 306. The second end 306 is depicted as folded down over an exit port of the corresponding conduit 304. This depiction, however, is not intended as limiting. Other means are possible to position the plurality of turbulators 302 within their corresponding plurality of conduits 304.

In operation, the first end, i.e., opposite the second end 306, of the ribbon member is proximate an entry flow of heated gas and the second end 306 is proximate an exit flow of heated gas. The ribbon member is operational to induce turbulence in a heated gas flowing through the conduit 304. Such turbulence increases contact between the heated gas and the conduit 304 and enhances thermal mixing. The varying pattern allows the ribbon member control over turbulence within the conduit 304, thereby augmenting heat transfer within the heat exchanger 300.

Figure 4A:
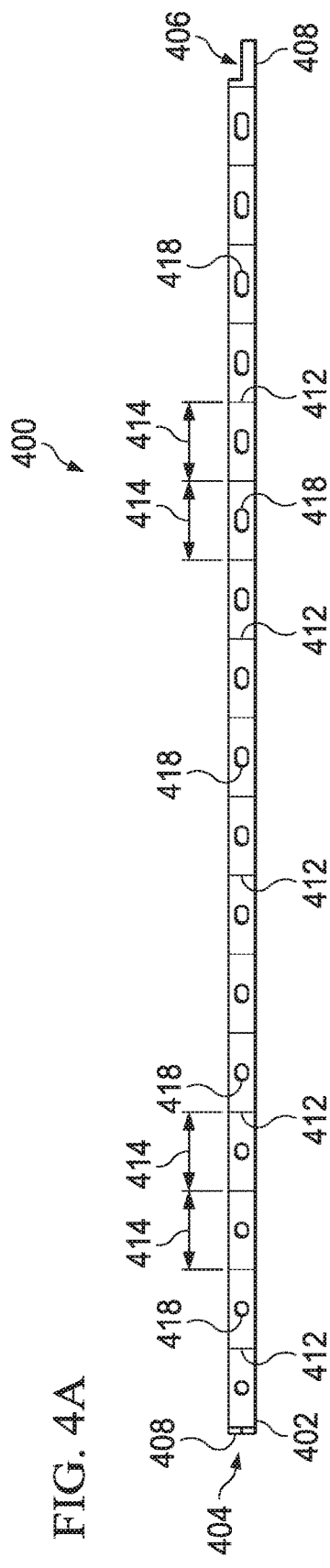
FIG. 4A is a top view of a turbulator for enhancing heat transfer within a heat exchanger according to an illustrative embodiment.
Figure 4B:
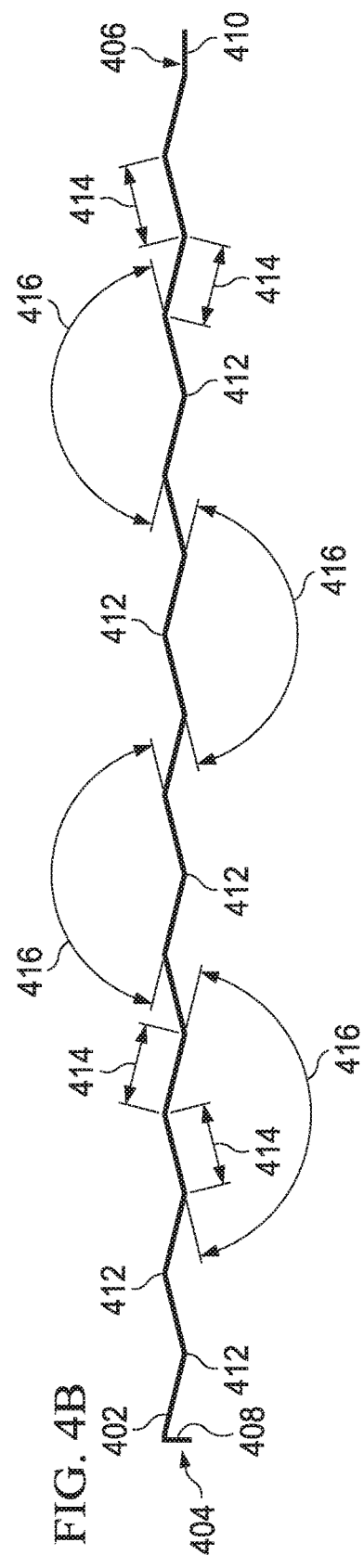
FIG. 4B is a side view of the turbulator of FIG. 4A.

Now referring primarily to FIGS. 4A and 4B, an illustrative embodiment is shown of a turbulator 400 for enhancing heat transfer within a heat exchanger. The turbulator 400 is analogous to individual turbulators found in the plurality of turbulators 302 of FIG. 3. FIG. 4A presents a top view of the turbulator 400 and FIG. 4B presents a side view. The turbulator 400 includes a ribbon member 402 having a first end 404 and a second end 406. In some embodiments, the first end 404 may terminate in a first tab 408 and the second end 406 in a second tab 410. In such embodiments, the first tab 408, the second tab 410, or both may be bent to secure a position of the ribbon member 402 within a conduit (e.g., 304 in FIG. 3) of the heat exchanger. The ribbon member 402 also has a length extending from the first end 404 to the second end 406. A varying pattern is formed into the ribbon member 402 over the length. The varying pattern may take numerous configurations such as expanding zig-zag patterns, uniform zig-zag patterns with varying apertures at any location on the segments or between, twisting patterns of varying segments, bends, etc. or any combination thereof. The depiction of the varying pattern in FIG. 4A is not meant to be limiting.

In operation, the ribbon member 402 induces turbulent flow in heated gas passing through the conduit of the heat exchanger. Turbulent flow improves contact between the heated gas and surfaces of the conduit, which are convectively cooled by a blower. Turbulent flow also enhances thermal mixing of the heated gas, reducing temperature gradients that would otherwise isolate hot regions of heated gas away from such surfaces. The varying pattern enables the ribbon member 402 to compensate for changing characteristics of the heated gas, augmenting heat transfer within the heat exchanger. It will be appreciated that physical properties of the heated gas, such as a heat capacity and a dew point, change along the conduit as temperatures progressively decrease and condensate forms. Thus, the varying pattern is better adapted to augment heat transfer than a static or periodic pattern. An example of the periodic pattern includes a continuous twist having revolutions that complete at equal distances.

Figure 4C:
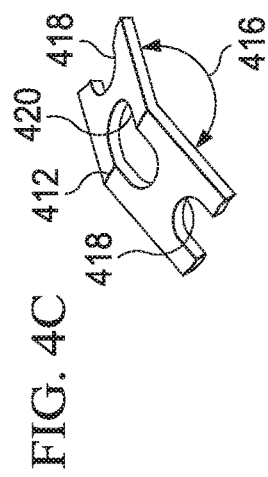
FIG. 4C is a detail of a bend in a ribbon member showing a longitudinal notch.

In some embodiments, the varying pattern includes a plurality of bends 412 spaced along the ribbon member 402. The bends 412 each form acute angles. A longitudinal notch 420 may optionally be disposed into at least one bend of the plurality of bends 412, as shown in FIG. 4C. The plurality of bends 412 define intervals of alternating pitch portions 414 that form a zig-zag sequence over the length. In such embodiments, intervals 414 between the bends 412 progressively increase in length as the ribbon member 402 is traversed from the first end 404 to the second end 406. In some embodiments, a peak angle 416 between adjacent intervals progressively increases as the ribbon member 402 is traversed from the first end 404 to the second end 406. In some embodiments, the plurality of bends 412 is oriented substantially parallel to a direction of air flow generated by the blower. In these embodiments, the direction of air flow impinges on the conduit substantially perpendicular to the conduit's longitudinal axis.

Figure 4D:
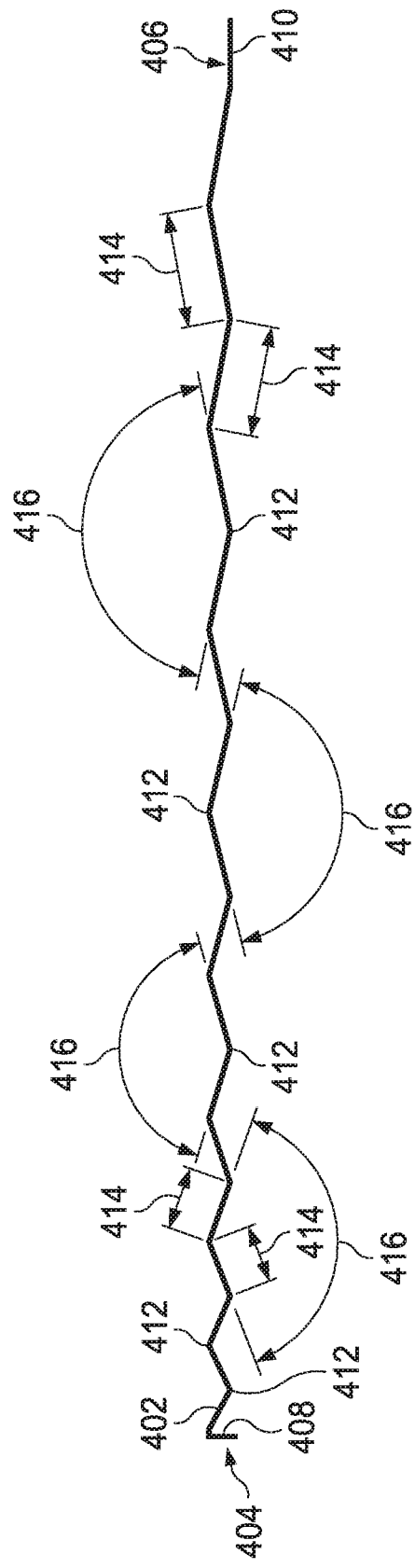
FIG. 4D is a side view of the turbulator of FIG. 4A modified to show progressively increasing intervals of alternating pitch.

FIG. 4D presents the progressively increasing lengths of intervals of alternating pitch 414 as described in the previous paragraph.

In some embodiments, the varying pattern includes a plurality of bends 412 spaced along the ribbon member 402. A longitudinal notch may be disposed into at least one bend of the plurality of bends 412. The plurality of bends 412 define intervals of alternating pitch portions 414 that form a zig-zag sequence over the length. In these embodiments, the ribbon member 402 is formed with a plurality of apertures 418 that are located on the intervals of alternating pitch portions 414. Each aperture 418 defines an area. The areas of the member of the plurality of apertures 418 increase as the length is traversed from the first end 404 to the second end 406. In further embodiments, the intervals of alternating pitch portions 414 are of equal length. In other embodiments, the plurality of bends 412 is oriented substantially parallel to a direction of air flow generated by the blower.

According to an illustrative embodiment, a method of manufacturing a heat exchanger for heat transfer within a gas furnace of an HVAC system includes the step of bending a ribbon member at predetermined lengths to form intervals of alternating pitch portions. The method also includes the step of forming apertures on each interval with a predetermined shape. The predetermined lengths and the predetermined shapes cooperatively define a pattern that varies longitudinally. In some embodiments, the method further involves the step of inserting the ribbon member into a conduit of the heat exchanger. In other embodiments, the predetermined lengths are selected such that the apertures gain in area as the ribbon member is traversed longitudinally. In still other embodiments, the method further involves the step of forming a longitudinal notch into a bend at one or more predetermined lengths.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

We claim:

1. A heating, ventilating, and air conditioning system, the system comprising:
   a burner for producing a heated gas;
   a heat exchanger fluidly-coupled to the burner for receiving the heated gas;
   a blower operable to generate air flow across the heat exchanger; and
   wherein the heat exchanger comprises:
     a plurality of conduits,
     a corresponding plurality of turbulators disposed within the conduits, and
     wherein each turbulator comprises:
     a ribbon member having a first end and a second end,
     wherein the ribbon member has a length from the first end to the second end,
     wherein the ribbon member is formed with a varying pattern over substantially the entire length, wherein the first end is proximate an entry flow of the heated gas into the heat exchanger, and wherein the varying pattern comprises a plurality of bends spaced along the ribbon member, the plurality of bends defining intervals of alternating pitch, and wherein the varying pattern comprises one varying pattern selected from the group consisting of:

the intervals progressively increase in length as the ribbon member is traversed from the first end to the second end; and the ribbon member is formed with a plurality of apertures, wherein each aperture defines an area, and wherein the areas of the apertures increase from the first end to the second end.

2. The heating, ventilating, and air conditioning system of claim 1, wherein the varying pattern comprises the intervals progressively increasing in length as the ribbon member is traversed from the first end to the second end and wherein peak angles between adjacent intervals progressively increases as the ribbon member is traversed from the first end to the second end.

3. The heating, ventilating, and air conditioning system of claim 1, wherein the varying pattern comprises the intervals progressively increasing in length as the ribbon member is traversed from the first end to the second end and wherein the varying pattern further comprises a longitudinal notch disposed into at least one bend of the plurality of bends.

4. The heating, ventilating, and air conditioning system of claim 1, wherein the plurality of bends is oriented substantially parallel to a direction of air flow generated by the blower.

5. The heating, ventilating, and air conditioning system of claim 1, wherein the varying pattern comprises the ribbon member being formed with a plurality of apertures and wherein the intervals defined by the plurality of bends are of equal length.

6. The heating, ventilating, and air conditioning system of claim 1, wherein the varying pattern comprises the ribbon member being formed with a plurality of apertures and wherein the varying pattern further comprises a longitudinal notch disposed into at least one bend of the plurality of bends.

7. The heating, ventilating, and air conditioning system of claim 1, wherein the varying pattern comprises the ribbon member being formed with a plurality of apertures and wherein the plurality of bends is oriented substantially parallel to a direction of air flow generated by the blower.

8. A heat exchanger for heat transfer with a gas furnace in a heating, ventilating, and air conditioning system, the heat exchanger comprising:

a plurality of conduits;

a corresponding plurality of turbulators disposed within the conduits; and wherein each turbulator comprises:

a ribbon member having a first end and a second end, wherein the ribbon member has a length from the first end to the second end, wherein the ribbon member is formed with a varying pattern over the length, wherein the first end is proximate an entry flow of heated gas into the heat exchanger, and wherein the varying pattern is over substantially the entire length of the ribbon member, the varying pattern comprises a plurality of bends spaced along the ribbon member with the plurality of bends defining intervals of alternating pitch portions, and the varying pattern comprises one of the varying patterns from the group consisting of:

the intervals progressively increase in length as the ribbon member is traversed from the first end to the second end, and the ribbon member is formed with a plurality of apertures, each having an area, and wherein the areas of the apertures increase from the first end to the second end.

9. The heat exchanger of claim 8, wherein the varying pattern comprises the intervals progressively increase in length as the ribbon member is traversed from the first end to the second end and wherein peak angles between adjacent intervals progressively increases as the ribbon member is traversed from the first end to the second end.

10. The heat exchanger of claim 8, wherein the varying pattern comprises the intervals progressively increase in length as the ribbon member is traversed from the first end to the second end and wherein the varying pattern further comprises a longitudinal notch disposed into at least one bend of the plurality of bends.

11. The heat exchanger of claim 8, wherein the varying pattern comprises the ribbon member being formed with a plurality of apertures, each having an area, with the areas of the apertures increasing from the first end to the second end and wherein the intervals defined by the plurality of bends are of equal length.

12. The heat exchanger of claim 8, wherein the varying pattern comprises the ribbon member being formed with a plurality of apertures, each having an area, with the areas of the apertures increasing from the first end to the second end and wherein the varying pattern further comprises a longitudinal notch disposed into at least one bend of the plurality of bends.

13. A method of manufacturing a heat exchanger for heat transfer within a gas furnace of a heating, ventilating, and air conditioning system, the heat exchanger comprising a plurality of tubes, the method comprising:

providing a plurality of ribbon members, each ribbon member having a first end and a second end and sized for insertion into one of the plurality of tubes;

bending each ribbon member at predetermined lengths to form intervals of alternating pitch portions;

forming a varying pattern over substantially the entire length of each ribbon member, wherein the varying pattern comprises one of the group consisting of:

forming apertures on each interval of alternating pitch portions, the apertures each having an area and formed with a predetermined shape, wherein the areas of the apertures increase from the first end to the second end, and the intervals progressively increased in length as the ribbon member is traversed from the first end to the second end.

14. The method of claim 13, further comprising the step of inserting the plurality of ribbon members into the plurality of conduits of the heat exchanger.

* * * * *